(12) United States Patent
Lofhus et al.

(10) Patent No.: US 6,292,208 B1
(45) Date of Patent: Sep. 18, 2001

(54) SENSING SYSTEM TO ALLOW SIDE-BY-SIDE WRITING OF PHOTONIC IMAGERS TO CREATE WIDE AND SEAMLESS XEROGRAPHIC IMAGES

(75) Inventors: Robert M. Lofhus, Honeoye Falls, NY (US); David Kirtland Fork, Los Altos; Dcai Sun, Sunnyvale, both of CA (US)

(73) Assignee: Xerox Corporation, Rochester, NY (US)

( * ) Notice: Subject to any disclaimer, the term of this patent is extended or adjusted under 35 U.S.C. 154(b) by 0 days.

(21) Appl. No.: 09/448,943

(22) Filed: Nov. 24, 1999

(51) Int. Cl.$^7$ ........................................... B41J 2/47
(52) U.S. Cl. ........................ 347/234; 347/233; 347/116
(58) Field of Search ................................. 347/233, 234, 347/248, 116; 359/201, 248; 250/548; 399/49

(56) References Cited

U.S. PATENT DOCUMENTS

| | | | |
|---|---|---|---|
| 5,208,633 | 5/1993 | Genovese | 399/162 |
| 5,287,162 | 2/1994 | de Jong et al. | 399/49 |
| 5,300,962 | 4/1994 | Genovese | 347/135 |
| 5,319,393 | 6/1994 | Genovese | 347/132 |
| 5,438,354 | 8/1995 | Genovese | 347/256 |
| 5,654,817 | * 8/1997 | De Loor | 359/201 |
| 5,689,763 | 11/1997 | Rathburn et al. | 399/53 |
| 5,732,162 | 3/1998 | Curry | 382/294 |
| 5,760,815 | 6/1998 | Genovese | 347/234 |
| 5,784,396 | 7/1998 | Guerin | 372/29.01 |
| 5,818,507 | 10/1998 | Genovese | 347/261 |
| 6,091,537 | * 7/2000 | Sun et al. | 359/248 |

* cited by examiner

Primary Examiner—Hai C. Pham
(74) Attorney, Agent, or Firm—Finnegan, Henderson, Farabow, Garrett & Dunner (57) ABSTRACT

An apparatus and method for stitching a at least two imagers together in a scanning system to produce accurate, wide and seamless images. The system includes a photoreceptor adapted to move in a process direction and at least two imagers for simultaneously forming a single scan line at a time, in a direction transverse to the process direction. The system also includes circuitry for stitching together the at least two imagers and for forming registration marks on the surface of the photoreceptor. Finally, the scanning system includes sensing circuitry for detecting displacements of successive registration marks and providing adjustment values to the stitching circuitry.

20 Claims, 5 Drawing Sheets

SENSING SYSTEM TO ALLOW SIDE-BY-SIDE WRITING OF PHOTONIC IMAGERS TO CREATE WIDE AND SEAMLESS XEROGRAPHIC IMAGES

BACKGROUND OF THE INVENTION

A. Field of the Invention

The present invention relates generally to scanning systems. More particularly, this invention relates to the use of imagers to create of xerographic images.

B. Description of the Related Art

Electrophotographic printers wherein a laser scan line is projected onto a photoconductive surface are well known. In the case of laser printers, facsimile machines, and the like, it is common to employ a raster output scanner (ROS) as a source of signals to be imaged on a precharged photoreceptor (a photosensitive plate, belt, or drum) for purposes of xerographic printing. The ROS provides a laser beam which switches on and off according to digital image data associated with the desired image to be printed as the beam moves or scans, across the photoreceptor. Commonly, the surface of the photoreceptor is selectively, imagewise discharged by the laser in locations to be printed white, to form the desired image on the photoreceptor. The modulation of the beam to create the desired latent image on the photoreceptor is facilitated by digital electronic data controlling a modulator associated with the laser source. A common technique for effecting this scanning of the beam across the photoreceptor is to employ a rotating polygon surface (the surface of the polygon typically being a mirror or other reflective surface); the laser beam from the ROS is reflected by the facets of the polygon, creating a scanning motion of the beam, which forms a scan line across the photoreceptor. A large number of scan lines on a photoreceptor together form a raster of the desired latent image. Once a latent image is formed on the photoreceptor, the latent image is subsequently developed with a toner, and the developed image is transferred to a copy sheet and fixed, as in the well-known process of xerography.

Figure 1:
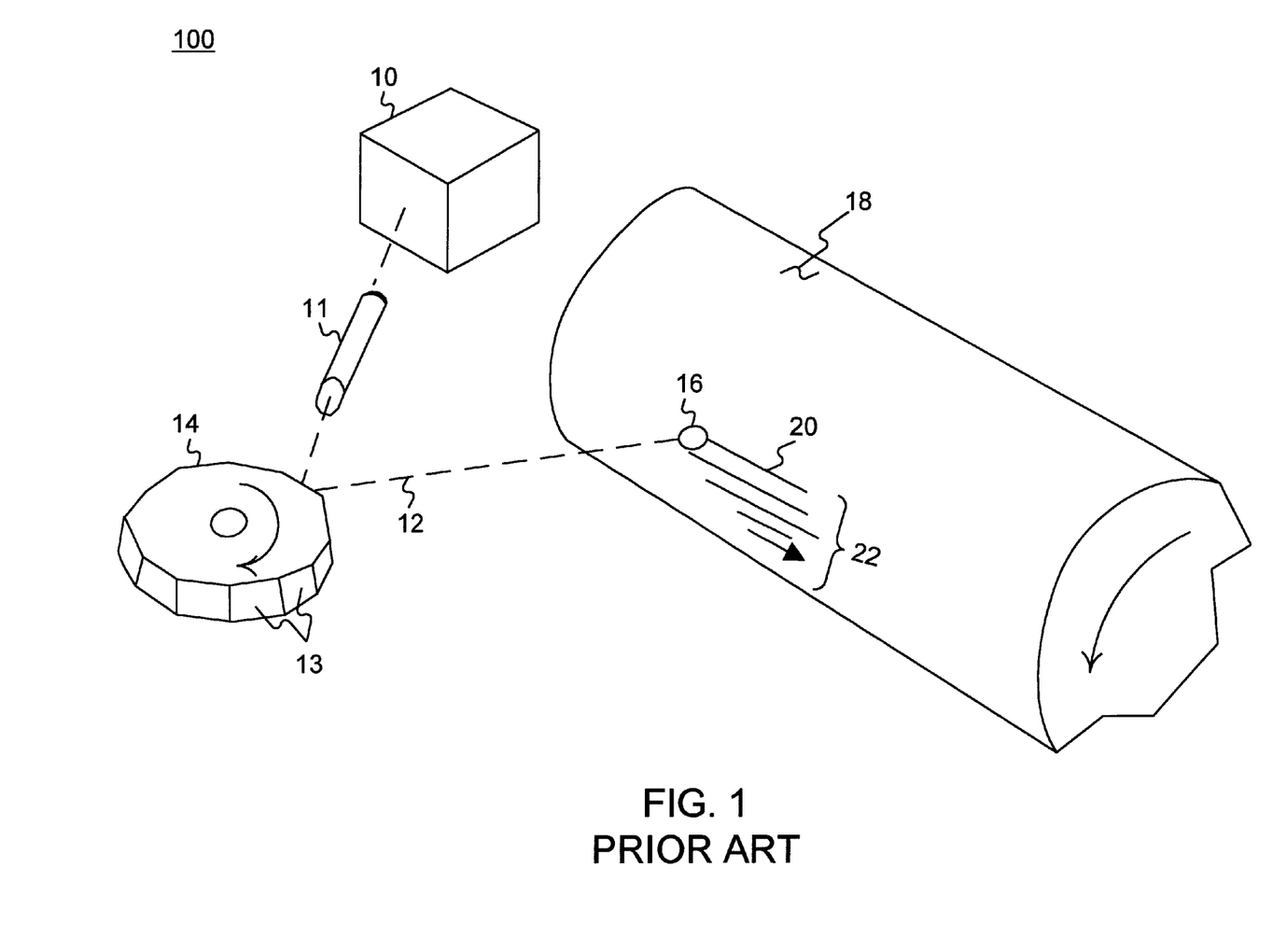
FIG. 1 illustrates a prior art scanning system.

FIG. 1 shows the basic configuration of a scanning system 100 used, for example, in an electrophotographic printer or facsimile machine. A laser source 10 produces a collimated laser beam, also referred to as a "writing beam", 12 which is reflected from the facets of a rotating polygon 14. Each facet of the polygon 14 in turn deflects the writing beam 12 to create an illuminated beam spot 16 on the pre-charged surface of photoreceptor 18. The system may further include additional optical elements such as focusing lenses. The energy of the beam spot 16 on a particular location on the surface of photoreceptor 18, corresponding to a picture element (pixel) in the desired image, discharges the surface for pixels of the desired image which are to be printed white. In locations having pixels which are to be printed black, the writing beam 12 is at the moment of scanning interrupted, such as by a modulator 11 controlled by imagewise digital data, so the location on the surface of photoreceptor 18 will not be discharged. It is to be understood that gray levels are typically imaged in like manner by utilizing exposure levels intermediate between the "on" and "off" levels. Thus, digital data input into laser source 10 is rendered line by line as an electrostatic latent image on the photoreceptor 18.

When the beam spot 16 is caused, by the rotation of polygon 14, to move across photoreceptor 18, a scan line 20 of selectively discharged areas results on photoreceptor 18. In FIG. 1, the photoreceptor 18 is shown as a rotating drum, but those skilled in the art will recognize that this general principle, and indeed the entire invention described herein, is applicable to situations wherein the photoreceptor is a flat plate, a moving belt, or any other configuration. The surface of photoreceptor 18, whether it is a belt or drum, moves in a process direction (as indicated by the arrow drawn on the side of the drum 18); the motion of spot 16 through each scan line 20 is transverse to the process direction (as indicated by the arrow drawn on the surface of the drum 18 and below scan line 20). The periodic scanning of beam spot 16 across the moving photoreceptor 18 creates an array of scan lines 20, called a raster 22, on the photoreceptor 18, forming the desired image to be printed. One skilled in the art will appreciate that such a configuration will typically further include any number of lenses and mirrors to accommodate a specific design.

In a rotating-polygon scanning system, there is a practical limit to the rate at which digital information may be processed to create an electrostatic latent image on a photoreceptor. One practical constraint on the speed of a system is the maximum polygon rotation speed. It can be appreciated that high quality images require precision placement of the raster scan lines as well as exact timing to define the location of each picture element or pixel along each scan. In a conventional polygon scanner, this precision is achieved by holding very close mechanical tolerances on the polygon geometry and the rotational bearings supporting the polygon body and drive motor. Experience has shown that beyond about 20,000 RPM, precision ball bearings with the required closeness of fit have limited life and are impractical in many scanner applications. As a result, exotic alternatives such as air bearings are sometimes used, but these represent a substantial increase in engineering complexity and maintenance, and hence cost. Another constraint is the size of the polygon itself; it is clear that the forces associated with high speed rotation increase with the diameter of the object being rotated. In particular, both the stored energy and the gyroscopic forces that must be restrained by the bearings increase with the square of the diameter. It is therefore prudent to limit the polygon size to maximize bearing life as well as reduce the potential for damage should a bearing fail at high speed.

In addition to practical constraints, the speed of a printer must be considered in conjunction with other competing desirable characteristics of a printer, particularly resolution. In purely optical terms, there is a trade-off between speed and resolution in a scanning system. The higher the resolution, that is, the more pixels that are designed to form a latent image of a given size, the lower the numerical aperture of the optical system required in order to define the pixels accurately. This trade off can be summarized by a derived equation for an under filled system relating the angular velocity $\omega$ of a polygon having a mean diameter D to the desired pixel size (that is, the inverse of resolution) $\Delta x$:

$$D\omega^2 = [L\lambda P^2/\Delta x^3][(60/\pi)^2 k/2][E/\chi]$$

The other variables in this equation are as follows: L is the length of the intended scan path, which in this context is the width of the photoreceptor across which the scan line is formed. P is the process speed, in inches per second, of the photoreceptor motion in the machine. k is a constant which depends on the intensity profile of the beam (for example, under a certain convention, the usable pixel size is dependent on a focused concentration where 86% of the total power of the beam is focused within a circular area of a given size). E is an efficiency, factor relating to the proportion of the "circumference" of the polygon which is practically usable for scanning purposes, i.e., because the numerical aperture for a given resolution $\Delta x$ requires a specific beam width at the polygon, the beam will not be reflected usefully for a certain portion of the time when the beam is focused near the ends of the facets of the polygon. The larger the ratio of facet length to beam width, the larger the proportion of the polygon rotation which is usable for scanning purposes. $\chi$ is the ratio of reflected scan angle to rotational scan angle, which depends on whether the facets of the polygon are parallel or oriented at 45 degrees to the axis of the polygon. If the facets are parallel, as in the illustrated case, then $\chi$ is equal to 2. There are some designs in which the facets of the polygon are set at 45 degrees relative to the axis so that the polygon has the general appearance of a truncated cone. In that case, the beam from the source is incident on the facets parallel to the axis of the polygon, and is reflected in a direction perpendicular to the axis; for this geometry, $\chi$ is equal to 1.

Looking at the most important system design variables in the above equation, the scan length L, the process speed P, and the spot size $\Delta x$, it is clear that the desire for a longer scan, faster throughput, and higher quality image (smaller spot size) all increase the value of the right hand side of the equation and are at cross-purposes with the need to keep the left hand side of the equation, representing the demands on the polygon, as small as possible. As a practical matter, it has been discovered that for electrostatographic printers, the largest practical polygon from a cost and safety standpoint is one having a diameter of about five inches, although diameters of about two inches are generally preferred from a standpoint of machine compactness. Simultaneously, system cost and engineering difficulties are rapidly compounded at rotational speeds of more than 20,000 rpm. The above equation, it should be remembered, has been derived strictly on the basis of optical laws and without consideration of practical limitations. There is, therefore, a distinct advantage in any arrangement which facilitates a substantial increase in the possible rate of digital data that may be imaged with a scanning apparatus, thereby providing the possibility of enhanced resolution, increased scan length, or faster process speed, in various proportions without violating the necessary relationship defined in the equation.

Therefore, there is a need in the art for a system that can produce fast, wide images, without increasing the size of the imager nor its distance from the photoresistive material.

SUMMARY OF THE INVENTION

Accordingly, it is an object of the present invention to meet the foregoing needs by providing systems and methods that allow the "stitching" of imagers (described more fully hereinafter) in a scanning system to produce accurate, wide and seamless images.

Specifically, a scanning system for meeting the foregoing needs is disclosed. The scanning system comprises a surface moving in a process direction; means for stitching together at least two imagers; imager means, corresponding to the at least two imagers, for simultaneously forming a single scan line at a time, transverse to the process direction; means for forming registration marks on the surface; and sensing means for detecting displacements of successive registration marks. Further, the detected displacements can be used by an actuator to align the imagers.

Both the foregoing general description and the following detailed description provide examples and explanations only. They do not restrict the claimed invention.

DESCRIPTION OF THE DRAWINGS

The accompanying drawings, which are incorporated in and constitute a part of this specification, illustrate embodiments of the invention and, together with the description, explain the advantages and principles of the invention. In the drawings.

DETAILED DESCRIPTION

Reference will now be made to preferred embodiments of this invention, examples of which are shown in the accompanying drawings and will be obvious from the description of the invention. In the drawings, the same reference numbers represent the same or similar elements in the different drawings whenever possible.

Systems and methods consistent with the present invention allow the efficient stitching of imagers in a scanning system. For purposes of the following description, the systems and methods consistent with the present invention are only described with respect to an ROS imager and split detectors. The description should also be understood to apply in the cases where other imagers and detectors are used.

Figure 2:
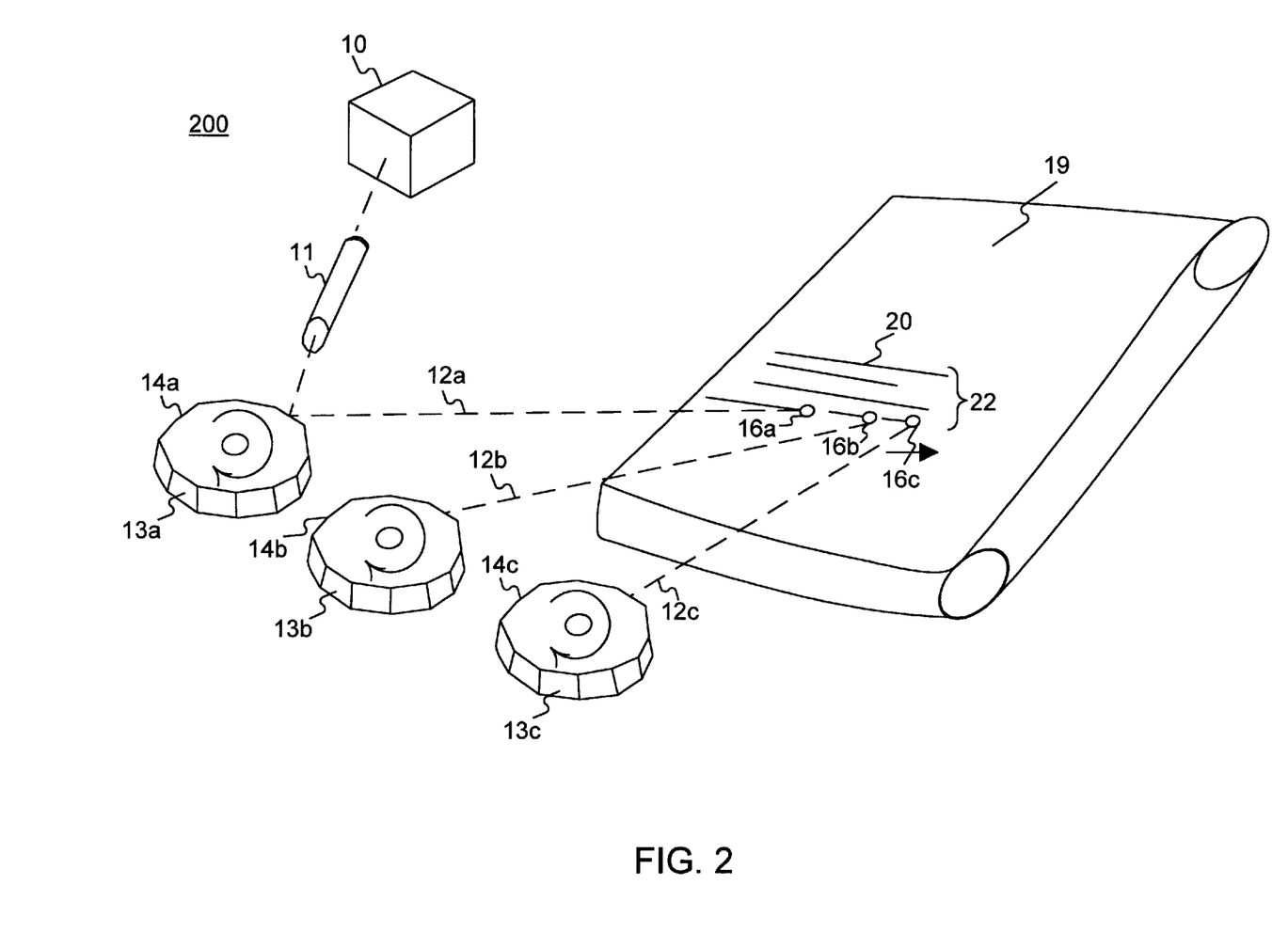
FIG. 2 illustrates one embodiment of the scanning system of the present invention.

FIG. 2 shows the preferred embodiment of a scanning system 200 according to the present invention. Among the major differences between the scanning system 200 and the scanning system 100 of FIG. 1, is that system 200 includes an intermediate belt 19, instead of the photoreceptor 18, and most notably, that system 200 incorporates the use of two additional polygons. The number of adjacent polygons (three, i.e. 14a–c) illustrated in FIG. 2, and thus, the number of ROSs, serves only as an example and does not limit the invention.

To reduce the complexity of the drawing illustrated in FIG. 2, the laser source 10 and the modulator 11 are shown only for one rotating polygon 14a. It will be appreciated that a laser 10 and a modulator 11 are needed for each additional polygon (e.g., 14b and 14c) operating in the scanning system 200.

The facets 13a–c from polygons 14a–c reflect writing beams 12a–c to form illuminated beam spots 16a–c on the intermediate belt (IB) 19. The energy of each of the beam spots 16a–c on a particular location on the surface of the IB 19 corresponds to a pixel in the desired image. These beam spots are produced simultaneously to form a scan line 20 on the IB 19. The location of the polygons 14a–c is important in that they must be able to simultaneously form the beam spots 16a–c and as long as those beam spots are aligned so as to produce a single scan line at a time. The arrangement of polygons discussed above is more generally described herein as a "stitching" of the ROSs. The range covered by each of the simultaneously formed spot beams 16a–c is referred to as a writing field. When three polygons are used as part of the scanning system 200, three adjacent writing fields are formed on the IB 19.

The advantages of the adjacent writing fields arrangement, as disclosed in the present invention, include producing a scan line length greater than that produced by a single ROS, resulting in wider images; in decreasing the distance between the imager (ROS) and the belt, resulting in a compact scanning system; and in the ability to produce images in less time, by reducing the scanning time of each line (as compared to the scanning, time achieved by a single ROS).

A general "stitching problem" arises in the prior art of direct marking when writing fields of multiple printing heads (or of a single head making multiple passes) are positioned adjacent to one another and do not produce an accurate image because of misalignment of the printing heads, lack of synchronization among the printing heads, etc. This is an issue for ink jet printers, for instance. The degree of success in solving the stitching problem determines directly the overall image quality.

The present invention solves the general stitching problem, and allows the ROSs to accurately print in a direction transverse to the process direction (in parallel). The present invention concerns the stitching of adjacent writing fields of photonic imagers, in particular, but not exclusively the Motor Polygon Assembly (MPA) ROS and the vertical cavity laser diode array printer, and utilizes a marks-on-belt (MOB) sensor to accurately measure the displacement of adjacent fields by looking at the toned image of a chevron pattern on the IB 19. With the relative position of adjacent writing fields known precisely, electro-mechanical actuators are used to position the adjacent writing fields to form a "seamless" latent image. Actuator means other than electro-mechanical actuator means could also use the relative position information determined by the methods of the present invention.

Figure 3:
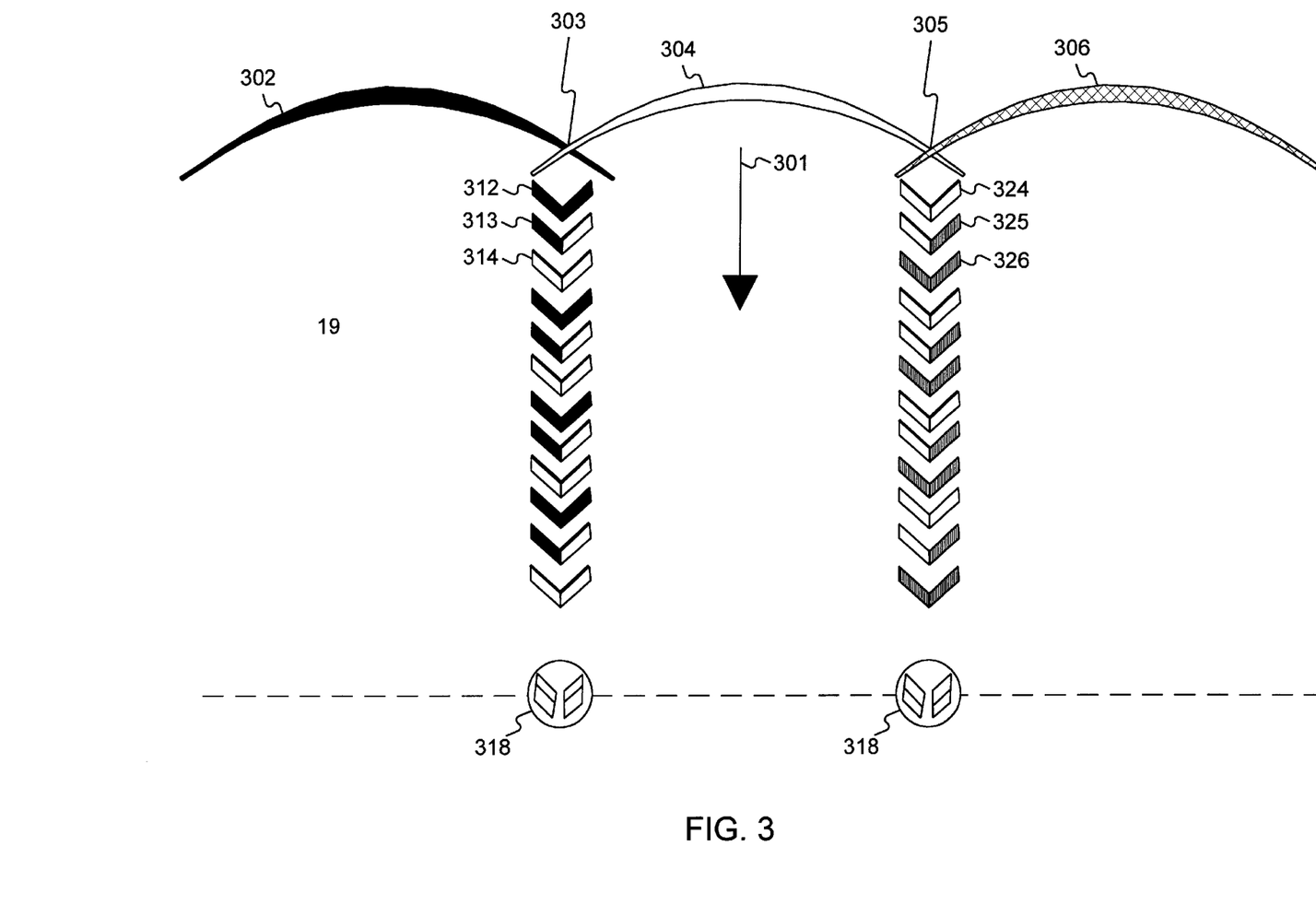
FIG. 3 broadly outlines the sensing system of the present invention.

FIG. 3 demonstrates the stitching problem and the sensing solution. The arrow 301 indicates the process direction of the IB 19. As the IB 19 moves at a velocity $V_{IB}$ in the process direction, chevron patterns (e.g., 312–314 and 324–326) are formed on the IB 19. The two rows of chevron patterns are formed by the adjacent writing fields 302, 304, and 306. Each writing field corresponds to a different imager (e.g., a ROS). The reason that the writing fields 302, 304 and 306 appear as curvilinear traces is because the corresponding beam spots 16a–c that form the traces are incident on the belt with a light intensity that is more dense in the center than at the edges of the writing field.

Note that in order to form the chevron patterns, the writing fields must overlap. For example, this overlap could be of 400 pixels. The left column of chevron patterns (i.e., 312, 313, 314, etc.) is produced by the overlap of adjacent writing fields 302 and 304. The left column is centered about the intersection point 303 of the writing fields 302 and 304. Likewise, a right column of chevron patterns (324–326) is formed by the overlap of the adjacent fields 304 and 306, and is centered about the intersection point 305 of the fields 306 and 304.

There are three types of chevron patterns that are formed (a "chevron element") on the IB on a per-column basis. Taking the left column as an example, the first chevron element 312 is formed entirely by a beam spot corresponding to writing field 302. The second chevron element 313 is formed by both of the adjacent writing fields 302 and 304. The left half of chevron element 313, positioned (in the figure) right below chevron element 312, is formed by the writing field 302, while the right half is formed by the writing field 304. The third chevron element 314 is formed entirely by the writing field 304.

In order to determine the relative displacement of writing fields 302 and 304 and the relative displacement of writing fields 304 and 306, two MOB sensors 3 18 are used. The sensors are positioned close to the IB 19, and detect the chevron elements as they pass over the sensors 318, due to the movement of the IB 19. The operation of sensors 318 will be explained with reference to FIG. 5A. For now it suffices to mention that both vertical and horizontal displacement of chevron elements with respect to one another is determined by an algorithm, disclosed as part of this invention, which takes into account the relative time differences between three successive marks, corresponding to the three types of chevron patterns (the chevron elements) mentioned above. The three successive marks as a whole are alternatively referred to as a registration mark pattern. The reason that the group consisting of the three chevron elements is repeated over and over again, to form column registration mark patterns, is that by doing so, an average of time differentials can be computed, which yields a better signal-to-noise ratio. The "signal", as used in this context refers to the signal detected and produced by the MOB sensor 318. This signal is used by ROS actuators (not shown), while the "noise" refers to noise sources, such as stray deposits due to imperfections on the IB surface and other factors, that cause the signal produced by the MOB sensors 318 to represent an inaccurate time of passage of a chevron element by the sensor 318. It is desirable, therefore, to have a system in which the signal-to-noise ratio is fairly high, in order to improve printing accuracy.

Although the idea behind a scanning system 200 is to have a final print in which the adjacent imager field contributions butt up to each other to within a few microns of positional accuracy, the actual fields must overlap sufficiently to be able to measure the relative displacement of one imager field to its neighbors. The registration mark pattern produced by the overlapping writing fields of the present invention is similar to the pattern disclosed in U.S. Pat. No. 5,287,162 (de Jong et at.), assigned to the present assignee. The major difference between the two registration mark patterns lies in the manner in which they are formed. Specifically, in the prior art reference the pattern is produced by several printers aligned in the process direction, without requiring an overlap of their writing fields, while in the present invention the writing fields must overlap in order to allow the stitching of the imagers in the parallel direction (transverse to the process direction).

Figure 4:
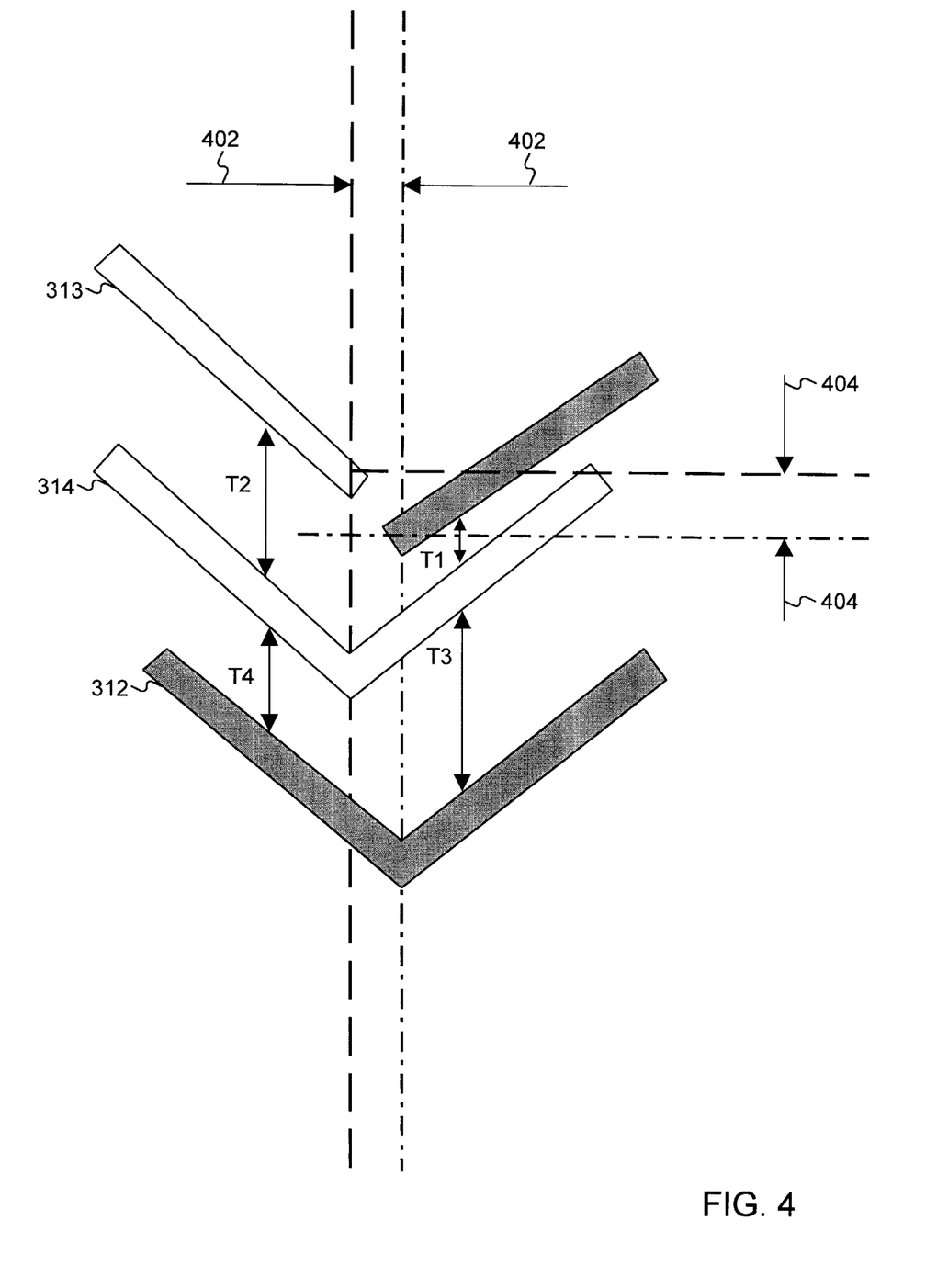
FIG. 4 illustrates an example of a registration mark pattern used by the sensing system of FIG. 3.

FIG. 4 shows a magnified registration mark pattern formed of three chevron elements 312–314. By comparing the chevron elements 312 and 314, respectively formed by writing fields 302 and 304 (FIG. 2), one can readily notice a relative displacement in the horizontal direction. A displacement in the vertical direction does not become apparent until a third chevron element 313 is formed by both writing fields 302 and 304. The registration mark pattern of FIG. 4 can be formed due to the capacity of writing fields 302 and 304 to overlap. The arrows 402 show the horizontal displacement while arrows 404 show the vertical displacement. Also shown in FIG. 4 are the time differences T1–T4 between the chevron elements. Time T2 corresponds to the time difference between the right-hand side "legs" of chevrons 313 and 314, while time T1 corresponds to the lefthand side legs. Time T4 corresponds to the time difference between the right-hand side legs of chevrons 312 and 314, while time T3 corresponds to the left-hand side legs. Although the arrows associated with times T1–T4 only extend from one edge of a chevron element to a second edge of another chevron element, the actual times T1–T4 are measured with respect to the relative position of the centroid of the marks.

The time differences T1–T4 are measured by a timer, not shown. What triggers the timer is the passage of the marks, specifically their centroids, over the MOB sensors. In the preferred embodiment of the present invention two split detectors are used to detect the position of the marks. The general operation of the split cell detectors will be explained with reference to FIG. 5A.

Once the time differences T1–T4 are recorded, the horizontal displacement 402 of a first ROS with respect to a second ROS is determined, as well as the vertical displacement 404. The following algorithm calculates the respective displacements:

Vertical Displacement=$V_{IB}*((T3+2*T1)-(T4+2*T2))/2$ and

Horizontal Displacement=$V_{IB}*(T3-T4)/2$;

where $V_{IB}$ is the assumed velocity of the IB. It is important to notice that the time differences T1–T4 can be calculated for a single mark registration pattern or can be calculated for an average of mark registration patterns, as mentioned above (to increase signal-to-noise ratio).

Figure 5A:
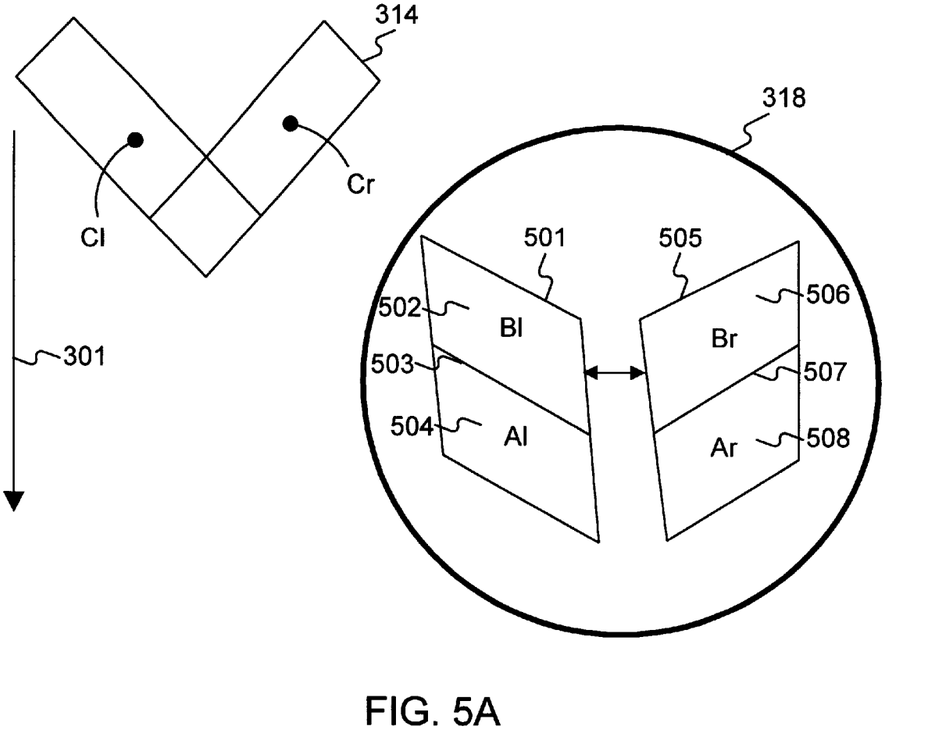
FIG. 5A illustrates a preferred embodiment of the sensor used in the sensing system of FIG. 3.

FIG. 5A shows two split detectors 501 and 505 used as a MOB sensor 318 for detecting the chevron element 314. Although the chevron element 314 has been drawn to the side of the MOB sensor 318, in a normal sensing operation the element 314 moves in the direction indicated by the arrow 301 so as to pass over and superimpose ("block") the detectors 501 and 505. Depending on the size of the detectors or chevron element 314, the detectors 501 and 505 can be blocked either partially or completely, depending on the instantaneous position of the chevron element 314.

The detector 501 is positioned so as to detect the right-hand side "leg" of the chevron element 314, and the detector 505 is positioned so as to detect the left-hand side "leg". Each detector is split into two cells. The detector 505 splits into cells Br (506) and Ar (508), separated by a narrow line 507, and the detector 501 splits into cells B1 (502) and A1 (504), separated by a narrow line 503. The explanation that follows assumes the ideal situation, not necessarily expressed in the drawings, where each detector is positioned at the same angle as the corresponding leg of the chevron element, and also has approximately half the same width as the corresponding element. The invention would still work even if the limitations just mentioned were not present. Those limitations only allow a more efficient detection of the chevron element 314.

The operation of the sensor is explained with relation to only one detector (e.g., 501). Detector 501 produces two electrical signals, such as a voltage, that correspond to the area of each cell 502 and 504 that has been blocked by a mark. The electrical signal produced by cell 502 is subtracted from the electrical signal produced by cell 504. The subtraction is performed by electronic means not shown in the drawings. In FIG. 5A, because neither cell (502 and 504) is originally blocked by a mark, both cells produce electrical signals of the same amplitude (and phase), and the result of the subtraction will be zero.

As the chevron element 314 moves in the process direction 301, its left leg starts to block cell 502. As a result, the amplitude of the signal produced by cell 502 is less than the amplitude of the signal produced by cell 504, which remains unblocked. Thus, the subtractions of the signals, dominated as Va-b, increases in value until the left leg of the chevron 314 starts blocking cell 504. As the left leg of the chevron 314 moves to block cell 504, the signal produced by cell 504 decreases in value, and thus, the resulting signal Va-b also starts to decrease.

When the centroid C1 of the left leg of the chevron crosses the line 503 dividing the cells 503 and 504, the blocked area of each cell is roughly the same (even if the chevron covers the entire area of the cells or only partially covers the area of the cells), and the value of the signal Va-b becomes zero. As the left leg continues to move into the cell 504 area and out of the cell 502 area, the signal produced by cell 502 becomes greater than the signal produce by cell 504 and the signal Va-b assumes a negative value. Finally, when the left leg of the chevron no longer blocks cells 504 and 502, the signal Va-b returns to a value of zero.

Figure 5B:
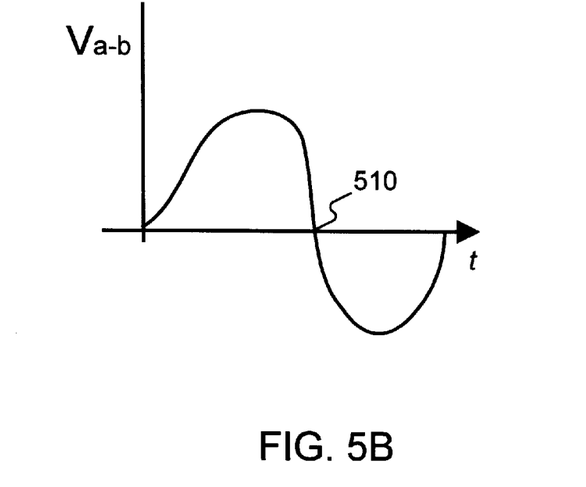
FIG. 5B is the graph of a function that corresponds to signals produced by detectors in the sensing system.

The signal Va-b produced as a result of the events discussed above is plotted as a function of time in FIG. 5B. Point 510 represents the time tc at which the centroid C1 crosses the line 503, as explained above. Time tc is recorded in order to determine the relative time differences between the left legs of chevrons passing over the detector 501. For example T2 represents the difference between the time recorded for the left legs of chevron 314 and chevron 313.

It is important to keep in mind that the description makes only reference to the left-side of the chevron and detector, but that the same description applies to the right-hand side. It is also important to note that the split detector as well as the mechanisms connected to the detector, in order to measure the time at which the centroids cross the line dividing the cells, are only preferred embodiments of the present invention and do not limit the invention.

Once the vertical and horizontal displacements are calculated using the algorithm disclosed above, these displacements can be used in combination with the knowledge that a first ROS is using, for example, its last 400 pixels to write a chevron element (or part of it), and that the second ROS was writing the chevron with its first 400 pixels, the relative position of the last pixel of the first ROS and the first pixel of the second ROS is easily calculated. As an example, consider the following scenario of how the relative displacement measurements could be used:

A) Electro-mechanical actuators could be used to appropriately move the ROSs so that vertical and horizontal relative displacements of adjacent ROS fields are integer multiples of the basic pixel spacing, say 1/600 of an inch for a 600 spots per inch (spi) ROS.

B) With relative displacements now given in known multiples of the basic pixel displacement, straightforward manipulations of the image in the (upstream) image path are all that is necessary to stitch together adjacent imager fields. The following strategies allow the parsing of an image in the horizontal and vertical directions:

1) In the horizontal direction knowing that pixel 2458 of the first ROS overlays pixel 317 of the second would easily establish that if the first pixel of the image started with the pixel 458 of the first ROS, then pixel 2001 of the image should correspond to pixel 318 of the second physical imager, etc.

2) In the vertical direction, line buffers of sufficient size are needed to handle the relative vertical offset. If the second ROS were vertically offset by 1/600 inch in the direction of IB travel relative to the first ROS, the (8-bit) pwm commands for the first 2 lines would go from 012 010 046 128 148 173 182 212 172 165 123 098 083 074 063 053 025

013 011 048 117 137 179 185 217 175 159 124 092 088 080 059 060 029 to become, assuming that the horizontal intersection occurs between the $8^{th}$ and $9^{th}$ pixels, 000 000 000 000 000 000 000 000 172 165 123 098 083 074 063

053 025 012 010 046 128 148 173 182 212 175 159 124 092 088 080 059 060 029

Note that the size of the (whole) line buffer depends upon the maximum vertical relative displacement after actuation, i.e., if actuation brings all imagers within a range of 0.15", vertically, then a 90 line buffer is needed.

This application is not limited, however, to these types of actuators, or to the necessity of having all relative displacements as multiples of the basic pixel spacing.

Electronic registration is an alternate, even preferred, actuator embodiment. The important point is that the sensing means discussed herein is not linked solely to any actuator type. Likewise, it is not required that the relative displacement be integer multiples of pixel size. As noted in the example given above for purposes of illustration, this made the image processing step easy to comprehend.

The stitching method proposed above also provides an effective means to stitch together VCSEL arrays. There are several advantages to stitching together multiple VCSEL printbars. First, the die size for the VCSEL arrays is limited by the wafer size of the GaAs, and hence this sets an upper limit of about 14 inches for the width of a single VCSEL printbar operating in projection. Second, utilizing more imagers and making each imager shorter would increase the yield of the resulting smaller laser die, and also simplify the assembly and handling. Third, since the field angle of the optics is generally fixed, using several, instead of one imager, reduces the track length and hence the overall size of the print engine.

Further related to the stitching of VCSEL printbars, adding about 400 extra pixels in order to allow for overlapping MOBs would add about 1.2 mm to the size of the GaAs die, and would permit using existing MOB sensors and methods. It may be feasible to shrink the size of the MOB and thereby the number of additional pixels considerably. Given that the proposed GaAs die length for the VCSEL bar is currently over 40 mm long, having the means to stitch together images from 2 to 4 smaller die would significantly shorten the array segments, while at the same time require only a small percentage of additional pixels.

In summary, the above two examples illustrate how the proposed sensing method could extend the applicability of xerographic images to wider architectures. In general, a scanning system with multiple subscanners that each write information onto overlapping MOBs is disclosed. The applicability to direct marking systems has been mentioned above, and requires only that the marks be generated and sensed on a substrate rather than a photoreceptor. This concept may also be extensible to very small subscanners.

The foregoing description of preferred embodiments of the present invention provides an exemplary illustration and description, but is not intended to be exhaustive or to limit the invention to the precise form disclosed. Modifications and variations are possible in light of the above teachings or may be acquired from practice of the invention.

What is claimed is:

1. A scanning system comprising:
    a surface moving in a process direction at a velocity $Vp/r$;
    at least two imagers, each imager being able to simultaneously form a beam spot on the surface, the beam spots moving and being simultaneously aligned in a direction transverse to the process direction to form a single scan line at a time of a certain length;
    at least two writing fields corresponding to the at least two imagers and defined by a range that each beam spot is capable of covering on the surface in order to form the scan line, the writing fields being adjacent to each other and overlapping on one region having a length defined by a fraction of the length of the scan line; and
    a plurality of sensors for detecting chevron marks formed on the surface by the imagers, each sensor aligned in the process direction with a point in the region where a pair of writing fields overlap.

2. The system of claim 1, wherein two beam spots, formed by two of the at least two imagers and corresponding to two adjacent, overlapping fields of the at least two writing fields, produce different types of chevron marks aligned along an axis formed in the process direction, the axis being centered at a point in the overlapping region of the writing fields; the different types of chevron marks comprising:
    a first chevron mark type being formed by a first beam spot,
    a second chevron mark type being formed by a second beam spot, and
    a third chevron mark type being formed by both first and second beam spots, the third chevron mark type having a first leg formed by one of the beam spots, and a second leg formed by the other beam spot.

3. The system of claim 2, wherein the different types of marks are formed on the surface by beam spots corresponding to each pair of adjacent writing fields of the at least two writing fields, the three types of marks forming a fixed sequence denominated as a registration mark pattern, and the registration mark pattern being periodically formed on the surface.

4. The system of claim 3, wherein as the chevron marks are formed on the surface, the movement of the surface in the process direction causes the marks to be detected by the plurality of sensors.

5. The system of claim 4, wherein the detection involves having the chevron marks pass over the sensors in a manner such as to block an area of the sensors for a period of time corresponding to the surface velocity $Vp/r$.

6. The system of claim 5, wherein the detection further involves having each sensor produce an electrical signal corresponding to the area of each sensor being blocked, said signal being used by the scanning system to determine and record the times at which a first leg and a second leg of a chevron mark passes over the sensor.

7. The system of claim 6, wherein for each registration mark pattern, time differences T1, T2, T3 and T4 between the chevron marks in the registration mark pattern are calculated; and wherein
    T1 is the difference between the time recorded for the first leg of the first mark and the time recorded for the first leg of the second mark;
    T3 is the difference between the time recorded for the first leg of the second mark and the time recorded for the first leg of the third mark;
    T2 is the difference between the time recorded for the second leg of the first mark and the time recorded for the second leg of the second mark; and
    T4 is the difference between the time recorded for the second leg of the second mark and the time recorded for the second leg of the third mark.

8. The system of claim 7, wherein the time differences T1, T2, T3 and T4, calculated for a registration mark pattern, are used to calculate a relative vertical and horizontal displacements between a pair of imagers producing the registration mark pattern; the horizontal displacement calculated by the equation $$\text{Horizontal Displacement} = V_{IB}*(T3-T4)/2;$$

and the vertical displacement calculated by the equation $$\text{Vertical Displacement} = V_{IB} * ((T3+2*T1)-(T4+2*T2))/2;$$

where $V_{IB}$ is either an assumed velocity of the surface or an actual velocity.

9. The system of claim 8, wherein the calculated displacement measurements are used by actuators electrically connected to the imagers in order to align the imagers.

10. The system of claim 9, wherein the imager is a Motor Polygon Assembly raster output scanner.

11. The system of claim 9, wherein the imager is a vertical cavity laser diode array printer.

12. The system of claim 5, wherein each sensor is comprised of two split detectors, a first detector corresponding to a first leg of the chevron mark and a second detector corresponding to a second leg of the chevron mark, and each split detector producing two electrical signals corresponding to the area of the detector being blocked, where the area of each detector is defined by two cells of approximately the same size and divided by a narrow boundary, the two signals produced by each detector assuming the same value either when the detector is unblocked, or when the centroid of the corresponding leg of the chevron mark passing over the detector is aligned with said boundary, said signals being used by the scanning system to determine and record the times at which the first leg and the second leg of the chevron mark passes over the corresponding detector, and that recorded time being chosen as the time when the centroid of the leg of a mark is aligned with the boundary.

13. The system of claim 12, wherein for each registration mark pattern, time differences T1, T2, T3 and T4 between the chevron marks in the registration mark pattern are calculated; and wherein:

T1 is the difference between the time recorded for the first leg of the first mark and the time recorded for the first leg of the second mark;

T3 is the difference between the time recorded for the first leg of the second mark and the time recorded for the first leg of the third mark;

T2 is the difference between the time recorded for the second leg of the first mark and the time recorded for the second leg of the second mark; and T4 is the difference between the time recorded for the second leg of the second mark and the time recorded for the second leg of the third mark.

14. The system of claim 13, wherein the time differences T1, T2, T3 and T4, calculated for a registration mark pattern, are used to calculate a relative vertical and horizontal displacements between a pair of imagers producing the registration mark pattern; the horizontal displacement calculated by the equation $$\text{Horizontal Displacement} = V_{IB} * (T3-T4)/2;$$

and the vertical displacement calculated by the equation $$\text{Vertical Displacement} = V_{IB} * ((T3+2*T1)-(T4+2*T2))/2;$$

where $V_{IB}$ is either an assumed velocity of the surface or an actual velocity.

15. The system of claim 14, wherein the calculated displacement measurements are used by actuators electrically connected to the imagers in order to align the imagers.

16. The system of claim 15, wherein the imager is a Motor Polygon Assembly raster output scanner.

17. The system of claim 15, wherein the imager is a vertical cavity laser diode array printer.

18. A scanning system comprising:
a surface moving in a process direction;
means for stitching together at least two imagers;
imager means, corresponding to the at least two imagers, for simultaneously forming a single scan line at a time, transverse to the process direction;
means for forming chevron marks on the surface said chevron marks comprising two writing fields adjacent to each other and overlapping on one region; and
sensing means for detecting displacements of successive chevron marks.

19. The system of claim 18, wherein the displacements of the registration marks are associated with misalignments of the imager means.

20. The system of claim 19, further comprising actuator means for aligning the imager means, wherein the actuator means align the imagers by using the displacements of chevron marks detected by the sensing means.

* * * * *